Figure 5:
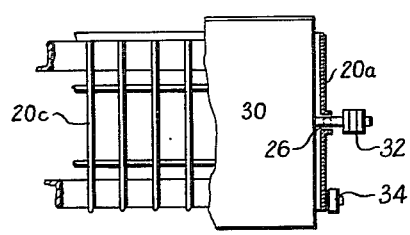

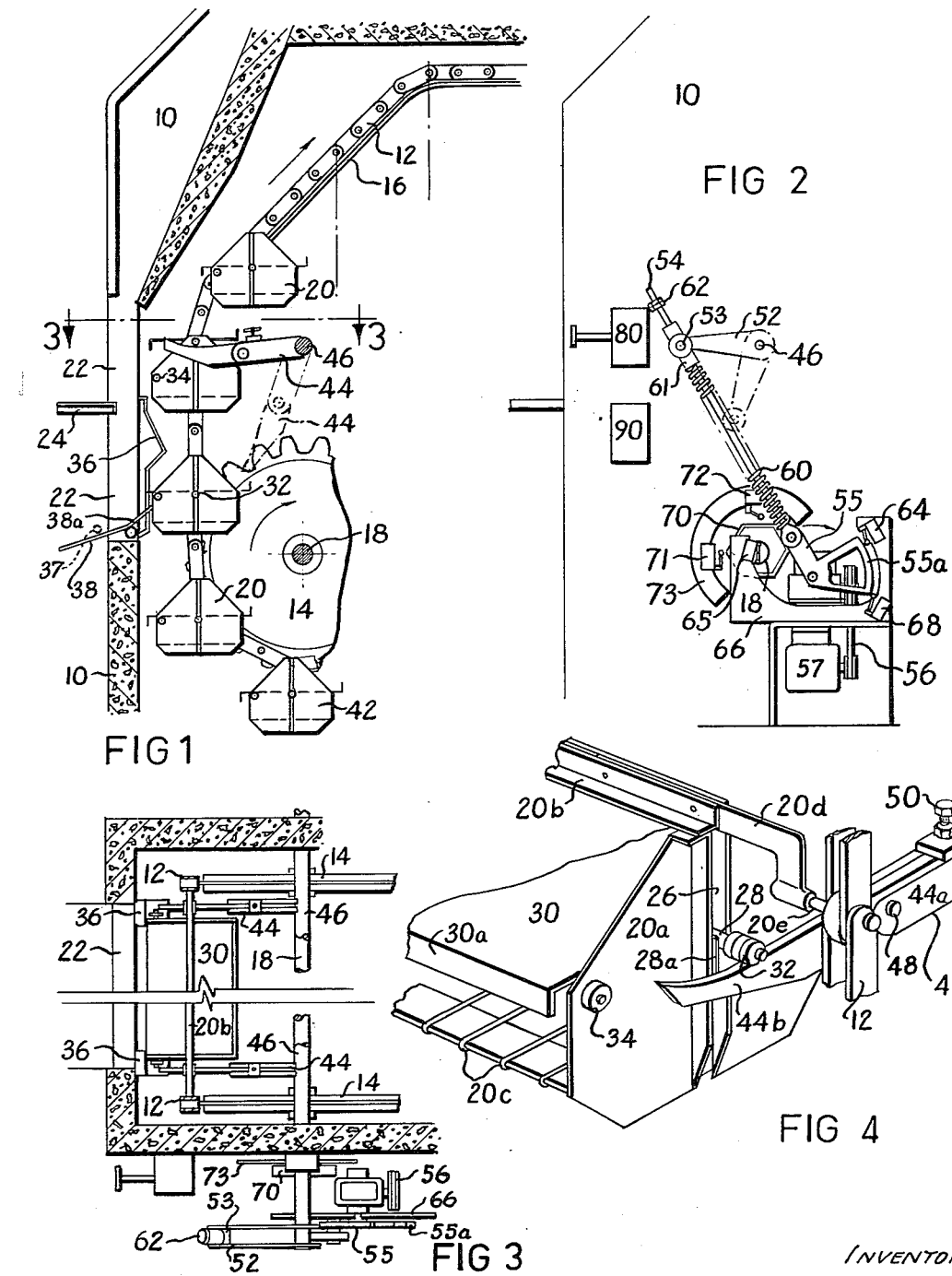

July 31, 1962 L. H. WILSON 3,046,913
CONTINUOUS BAKING OVENS
Filed Dec. 14, 1959 2 Sheets-Sheet 2

INVENTOR
LESLIE HENRY WILSON
By Irwin S. Thompson
ATTY.

United States Patent Office 3,046,913
Patented July 31, 1962

3,046,913
CONTINUOUS BAKING OVENS
Leslie Henry Wilson, 28 Gould St., Frankston,
Victoria, Australia
Filed Dec. 14, 1959, Ser. No. 859,253
Claims priority, application Australia Dec. 17, 1958
12 Claims. (Cl. 107—57)

A continuous bread baking oven usually comprises a plurality of spaced transversely disposed trays arranged between and pivotally supported by a spaced pair of endless conveyor chains, whereby the trays remain horizontal as the chains pass around sprockets and over guide rails.

For the production of condensed bread each of the trays serves to support a row of bread baking tins which are placed thereon as the trays successively register with a loading opening in the oven structure and which are removed when the trays arrive at a discharge opening which, in some cases, is also the said loading opening. Each tin is usually provided with a separate lid which is removed after the tins are withdrawn from the oven, the tins being then inverted to eject or de-pan the baked loaves.

The application and removal of the individual lids involves obvious disadvantages and it has previously been proposed to provide each tray of the oven conveyor with a hinged lid which is adapted to cover the row of tins thereon and which is automatically raised and lowered at appropriate positions. These hinged lids therefore are embodied in the conveyor, so that they remain in the oven, thereby obviating the use of the individual lids commonly used.

In order to bake continental and other open bread, the measured dough charges may be placed directly on the aforesaid trays, though for some types of open bread, uncovered baking tins are used, that is to say, the lids are omitted.

The general object of this invention is to provide improvements in continuous baking ovens for bread and the like, while one specific object is to provide improvements in the construction and operation of common lids for rows of baking tins or the like.

Another specific object is to provide improvements, whereby an oven provided with a conveyor incorporating common lids may be used for the production of either condensed or open loaves.

Accordingly the invention includes a continuous baking oven incorporating swing trays and including a lid associated with each tray and means whereby each lid is bodily raised and lowered relatively to the respective tray at predetermined positions in the path of the conveyor.

More particularly each tray and the lid associated therewith are preferably provided with coacting guide means which constrain the lid to remain substantially parallel to the tray base, as it moves towards and from the latter.

Preferably the lids are successively operated by actuating means disposed adjacent to a loading and/or discharge opening of the oven and operated in timed relation with the oven conveyor.

The said actuating means preferably comprise a spaced pair of arms secured to a transverse spindle and arranged to coact with corresponding projections on the opposite ends of the lid. As each tray is disposed adjacent to the oven opening these arms are caused to swing upwardly below the projections thereby to raise the lid relatively to the tray. The said arms may be rotated by the spindle but preferably they are alternately raised and lowered thereby.

The spindle may be mechanically coupled to the oven conveyor shaft but preferably it is driven by a separate power source which is controlled in timed relation with the said shaft.

Preferably the lid is capable of descending until it rests on or is disposed close to the tray base in order that the lid may be used as a baking tray for continental or other open bread. For this purpose, the tray base is preferably of open construction, so that the hot oven gases may pass freely therethrough to the underside of the lid.

The invention further includes cam means operable to tilt the successive trays adjacent to the unloading position, thereby to effect the automatic discharge of the baked products.

Figure 6:
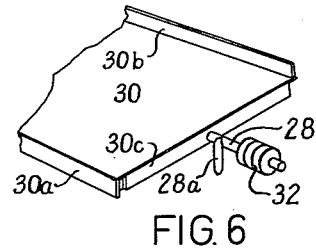
Figure 7:
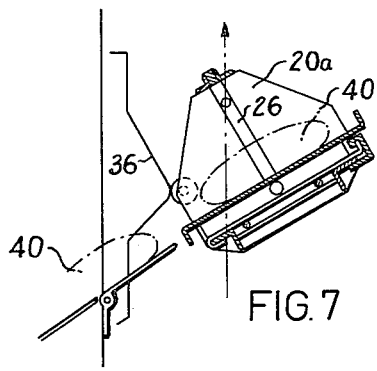
Figure 8:
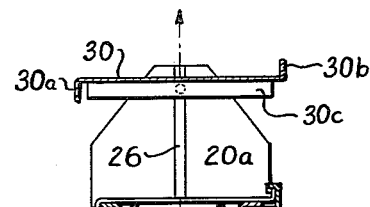
Figure 9:
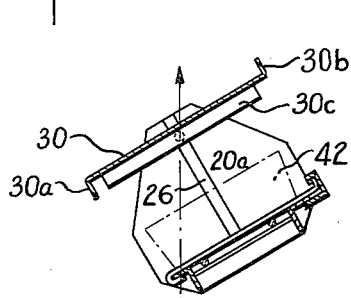
Figure 10:
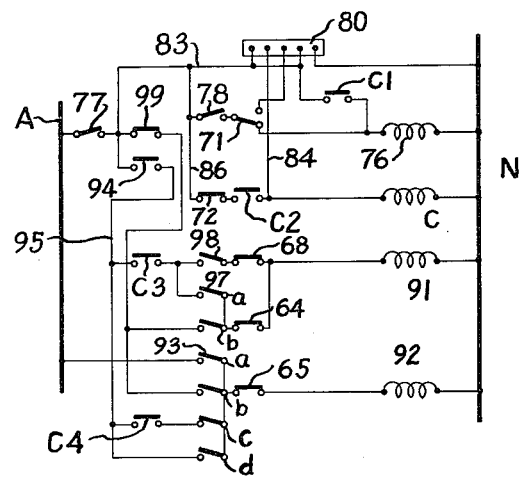

The invention is hereinafter more fully described with reference to the accompanying drawings, in which:

FIGURE 1 is a view in longitudinal section of the loading and discharge end of a continuous bread baking oven embodying the preferred form of the invention, FIGURE 2 is a view in side elevation of the same end of the oven, FIGURE 3 is a view in sectional plan taken on the line 3—3 of FIGURE 1, FIGURE 4 is a perspective view of one end of a swing tray and associated parts, FIGURE 5 is a view in sectional plan of the end of a tray, FIGURE 6 is a perspective view of one end of a tray lid, FIGURES 7, 8 and 9 are cross-sectional views of a tray and show different stages in the operation thereof, and FIGURE 10 is a diagram of a control circuit.

The continuous baking oven shown in the drawings is generally of the usual type and comprises a structure 10 forming an elongated chamber accommodating an endless conveyor. The conveyor comprises spaced chains 12 which pass around driving sprockets 14 and over fixed guide rails 16, the former being secured to a common drive shaft 18 which has its ends projecting through the side walls of the oven.

The conveyor chains support the opposite ends of regularly spaced swing trays generally designated 20 which extend transversely therebetween and are pivotally supported thereby.

The illustrated end of the oven is formed with a large opening 22 which extends across substantially the full width thereof and a loading platform 24 extends transversely across the opening approximately midway of the height thereof. The portion of the opening 22 above the platform constitutes the loading opening, while the portion therebelow is the discharge opening.

The conveyor is actuated intermittently by the driving sprockets in the direction of the arrows in FIGURE 1, whereby the trays 20 move upwardly in succession to and stop at the loading station in which the base or shelf of the tray is approximately level with the loading platform as shown in the figure. The design of the illustrated mechanism is such that the driving sprockets are turned through an angle of 60° during each actuation thereof to move each swing tray from one station to the station immediately in advance thereof.

Each swing tray 20 comprises vertical end plates 20a which are connected at their upper ends by angle bars 20b which extend longitudinally at a suitable height above the base of the tray and transversely with respect to the oven conveyor. See FIGURES 4 to 9 inclusive.

The tray base comprises spaced transversely extending rods 20c having their ends secured to angle members which connect the lower portions of the opposite end plates 20a. The base is thus of open-work construction so that the oven air may pass freely therethrough.

An extension arm 20d with a downwardly turned outer end is connected to the upper angle bars 20b at each end of the tray and the free ends of these arms are fitted with coaxially aligned pivot pins 20e which pivotally connect the adjacent links of the respective conveyor chain 12.

Each end plate 20a of the tray is formed with a vertical guide slot 26, the sides of which are defined by flanges provided on corresponding sections of the plate and these slots accommodate pins 28 which project centrally from the opposite ends of a sheet metal lid 30 arranged above and which is substantially equal in length to the tray base. The lid is reinforced by integral flanges 30a and 30b, formed on the longitudinal edges thereof and by downwardly turned end flanges 30c. The flange 30a at the outer longitudinal edge is downwardly turned, while the flange 30b is turned upwardly to serve as a rear stop when the lid is used as a baking tray, as hereinafter described.

Each of the end pins 28 on the lid is formed with a depending arm 28a which is located within the respective guide slot 26 and which permits of only a small angular movement of the lid. Thus the lid is permitted to move upwards and downwards in a rectilinear path disposed at right angles to the tray base while being maintained approximately parallel thereto. In addition however, the lid is capable of limited angular movements, so that it may align itself with baking tins supported on the tray base.

The free ends of the lid pins 28 project beyond the end walls of the tray and are fitted with antifriction rollers 32 for engagement by the lifting arms hereinafter described.

Each end plate 20a of the tray is provided on its outer face and near its forward edge with a roller 34 and these rollers coact with inclined tilting cams 36 which are secured to the oven structure at each side of the opening 22 therein below the loading station and above the station immediately therebelow. Thus as each tray is moving upwardly to the loading station, the rollers 34 thereon engage the tilting cams 36, whereby the tray is caused to swing inwardly so that the base thereof inclines downwardly and outwardly to effect the automatic discharge of the baked bread. See FIGURES 7 and 9.

The thus discharged bread is received by an inclined chute 38, the inner portion 38a of which has the form of a pivoted flap so that its free end may be lifted by the tray base as it passes that position. If desired the tins may be automatically inverted as they slide down the chute by providing a rod 37 or other shallow obstruction in the path thereof. The bottom of the leading end of each tin is thus suddenly arrested whereby due to the angular attitude of the tins and the momentum thereof, their rear ends swing upwardly and forwardly above their leading ends.

When the tray lids 30 are disposed in their lowermost positions, they rest on the bases of the trays and are utilized to support the dough or baking tins for the production of continental or other open bread. See FIGURE 7 which shows a baked loaf 40 in the discharge position. After the bread is thus discharged, the lid is again loaded with dough at the loading station.

When however it is desired to bake condensed bread, the lids are raised at or near the loading station, so that the bread tins 42 may be placed on the tray base below the lid, after which the latter is lowered so as to rest on and cover the open tops of the tins.

For this purpose the lids are raised by two lifting arms generally designated 44 secured to a common transversely disposed spindle 46 arranged above and parallel to the driving spindle 18 so as to be located inwardly of the trays at the loading station. These arms are spaced apart by a distance which is slightly greater than the length of the trays so as to engage the aforesaid rollers 32 on the projecting ends of the lid pins 28.

More particularly, each lifting arm comprises spaced inner members 44a which are rigidly secured to the spindle 46 and an outer member 44b which has its inner end extending between, and is connected by a knuckle joint to, the outer ends of the inner members, the said knuckle joint being formed by a pivot pin 48 and by an adjusting screw 50 which engages a tail or inward extension on the outer member 44b. These knuckle joints prevent damage to the mechanism if through incorrect adjustment the lift arms while descending should foul the ascending swing tray adjacent thereto.

When the lifting arms 44 are retracted, they occupy the position shown in broken lines in FIGURE 1 and the spindle 46 thereof is operated as hereinafter described, so that after each tray has commenced its final movement to the loading station, the arms are swung forwardly and upwardly below the projecting pins 28 on the lid, so as to raise the latter from the baking tins before the tray is tilted to its full extent. See FIGURE 9.

If the tray is to be reloaded with baking tins at the loading station, the lid is retained in its raised position until the tray leaves that station, as indicated in full lines in FIGURE 1.

The operation of the lifting arms is varied, as hereinafter described, when changing from the production of open bread to condensed bread and vice versa.

The spindle 46 of the lifting arms 44 may be operated in timed relation with the conveyor by any convenient electrical, hydraulic or mechanical mechanism and in the illustrated construction, the spindle 46 projects through one side wall of the oven and is fitted with a double arm 52 having a transverse pin 53 pivotally mounted in the free end thereof. The pin 53 is formed with a diametrical hole which slidably receives the upper portion of a connecting rod 54 which has its lower end pivoted to a crank arm 55 secured to the output spindle of a worm reduction gear of well-known construction driven by a belt 56 from a reversible electric motor 57. See FIGURES 2 and 3.

The crank arm 55 normally moves through an angle of approximately 180° and is shown in its upper limit position in FIGURE 2, from which it moves downwardly in the clockwise direction, as indicated by the arrow therein.

The connecting rod 54 is surrounded by a long compression spring 60 which abuts at its upper end against a slidable collar 61 on the rod and the projecting upper end of the latter is fitted with nuts 62 which form an adjustable stop.

Thus the lifting arms 44 are raised by the pressure exerted on the arm 52 by the spring 60, in order that the arm 55 may be moved to its uppermost position before the operative swing tray has arrived at the loading station. In these circumstances, the spring 60 serves to raise the lift arms until the lid of the respective tray is raised to its full extent and the said spring then maintains the lid in its fully raised position, while the tray moves to and stops at the loading station. It may here be mentioned that when the lid is fully raised, the end pins 28 thereof are disposed approximately in coaxial alignment with the pivot pins 20e of the tray, as shown for example, in FIGURES 8 and 9.

It will also be apparent from the preceding description and from FIGURE 2 of the drawings, that the nuts 62 on the upper end of the connecting rod 54 ensure that the lifting arms are positively retracted to their lowermost positions when the operating crank arm 55 returns to its lower limiting position.

The described upper and lower limit positions of the crank arm 55 are determined by micro-switches 64 and 65 respectively, which are adjustably mounted on a fixed vertical plate 66 and which are operated by a segment 55a formed integrally with the crank arm 55.

The said micro-switches 64 and 65 are arranged in circuit with up and down direction relays in the control circuit of the motor 57, as hereinafter further explained and it will be observed that in FIGURE 2, the "up" limit switch 64 is shown as having been operated by the segment 55a to open the circuit of the up direction relay.

A further micro-switch 68 is adjustably mounted on the plate 66 between the switches 64 and 65 to serve as the up direction limit switch in certain circumstances, as hereinafter explained.

The adjacent projecting end of the conveyor drive shaft 18 is fitted with a hexagonal cam 70 which coacts with two further micro-switches 71 and 72 adjustably mounted on a fixed vertical plate 73 of arcuate form. The switch 71, which is a two-way switch, operates to cause the conveyor to stop and to close a restarting circuit embodying a timing unit, while the switch 72 operates while the conveyor is in motion to initiate certain functions as hereinafter described. Thus it will be seen that the switches 71 and 72 are operated by the successive corners of the hexagonal cam and that they operate alternately. Accordingly, in FIGURE 2, the switch 71 is shown in the operated condition as the arm thereof is engaged by one corner of the cam 70, while the switch 72 is not operated as, at this time, the arm thereof is disposed approximately midway between two adjacent corners of the cam.

In the following brief description of the general operation of the apparatus, reference is made to the simplified wiring diagram shown in FIGURE 10.

The conveyor driving motor starts when the winding 76 of the main contactor is energized and, assuming that the conveyor is moving, the closed circuit of the said winding may be traced from the active line A through manually controlled switches 77 and 78 which are closed at this time and through the normally closed contacts of the micro-switch 71 and the winding 76 to the nuetral line N.

When each corner in turn of the hexagonal cam 70 operates the switch 71, the normally closed contacts thereof are opened to de-energize the winding 76, so that the main contactor drops out and the conveyor stops.

The switch 71 also has normally open contacts which are closed when the switch is operated by the cam and these contacts close to complete the circuit of an adjustable electronic timing unit 80. This circuit may be traced from line A through closed switches 77 and 78 and the normally open, but now closed, contacts of the cam switch 71 to the timing unit 80 and line N. This timing unit operates, after the lapse of an interval determined by the adjustment of the unit, to close the circuit of an auxiliary relay C through a path extending from line A through closed switch 77, conductor 83, the relevant contacts (now closed) of the timer, conductor 84 and the winding of relay C to line N.

The relay C operates to close its normally open contacts C1 and C2 and the former in closing, again complete the circuit of the winding 76 of the main contactor, so that the conveyor is re-started after a predetermined time delay. This circuit is traced from line A through switch 77, conductor 83, closed contacts C1 and winding 76 to line N.

Contacts C2 in closing, complete a holding circuit for relay C and extending from line A through closed switch 77, conductor 86, the contacts of microswitch 72 which are closed at this time, closed contacts C2 and the winding of relay C to line N.

When the main driving shaft 18 has completed approximately one-half of its movement, a corner of the hexagonal cam 70 opens the switch 72, thus breaking the circuit of the auxiliary relay C and this relay in dropping out opens its contacts C1 and C2. The winding 76 of the main contactor is not however, de-energized by the separation of contacts C1, because during the initial movement of the main drive shaft 18, the micro-switch 71 was released to close the initially traced holding circuit of this relay.

Consequently, the main driving sprockets 14 are intermittently rotated through angles of 60° at a time, so as to move each swing tray in turn to the loading station and to cause it to remain there for a predetermined period.

The movements of the lid lifting arms 44 are controlled automatically in a manner to suit the particular type or types of bread to be produced and for this purpose, manually operable selector switches are arranged within a box 90 near the loading and discharge end of the oven, as shown in FIGURE 2.

It has previously been explained that when the oven is being used to bake open bread only, each tray lid 30 remains at all times, in its lowermost position in which it rests on the tray base as shown in FIGURE 7. Thus when open bread only is to be baked, the lifting arms 44 are not operated, but are retained in their fully retracted positions shown in broken lines in FIGURE 1.

The operation of the reversible driving motor 57 for the lifting arms 44 is controlled by up and down direction relays having windings 91 and 92 respectively (FIGURE 10) and when open bread is being baked, the circuit of the "down" relay 92 is prepared by closing the "d" contacts of the manually operated selector switch 93 which also has additional switch contacts designated "a," "b" and "c." This causes the motor to start in the down direction as soon as the conveyor starts, unless the lifting arms are already fully retracted and the movement continues until the down limit switch 65 is opened in the manner above described. This circuit is traced from line A through closed switch 77, normally open switch 94, which closes automatically when the main contactor relay 76 is operated, conductor 95, closed selector switch contacts 93d, down limit switch 65 and the winding 92 of the down direction relay to line N.

When condensed bread only is being baked in the oven, it is necessary for the lifting arms 44 to commence to move upwardly shortly after the commencement of each operation of the oven conveyor in order that the lid 30 of the tray approaching the loading station will be lifted from the baking tins before the tray is tilted to discharge the latter as shown in FIGURE 9. Also, the lid must be retained in its raised position until the tray stops and is loaded at the loading station (FIGURE 8). As the loaded tray commences to move upwardly from the loading station, the lifting arms descend, so that the lid is lowered onto the bread tins and it remains in that position until the tray reurns to the discharge position.

For this purpose, the manually operated selector switch contacts 93c and 97a are closed, the latter being in the circuit of the up direction relay 91 and the former in circuit with the down direction relay 92.

The circuit of the up direction relay 91 is completed when relay C drops out and this occurs when the switch 72 operates after the conveyor has made a partial movement. The closed circuit is traced from line A through closed contacts 77, contacts 94, which were closed when conveyor relay 76 was energized, normally closed contacts C3, closed contacts 97a, closed upper limit switch 64 and winding 91 to line N. Thus the lifting arms 44 start to move upwardly shortly after the respective tray has commenced to move, whereby the lid is raised before the tray is fully tilted.

The lifting crank arm 55 continues to move until it reaches its uppermost position at which the limit switch 64 is automatically opened to break the circuit of the relay 91. The lifting arms 44 have however, been unable to move in unison with the crank, because when the lid is lifted to the top of the tray which is still below the position of maximum tilt, the upward movement of the lifting arms is determined by the speed of the tray. The connecting rod 54 thus over-rides the arm 52, thereby compressing the spring 60 which maintains the lid in its uppermost position, while the tray moves to and remains at the loading station.

When the main contactor winding 76 is re-energized to cause the conveyor to commence another movement, the circuit of the winding 92 of the down direction relay is immediately energized, this circuit being traced through contacts 94, conductor 95, contacts C4 of relay C which are closed as the relay is energized, closed selector switch 93c, bottom limit switch 65 and winding 92. The lifting arms thus return to and stop at their fully retracted positions.

When changing the oven over from open bread to condensed bread, it is necessary for the tray lids to remain down, while the trays are tilted to discharge the open bread and to be raised before the tray is loaded with baking tins at the loading station. For this purpose, the selector switch mechanism is operated to close contacts 93d and 97b. Contacts 97b are in circuit with normally closed contacts 99 of the conveyor relay 76 and so are open, while the conveyor is moving. The lift arms 44 thus remain fully retracted until the tray stops at the loading station with the lid in its lowermost position. When the conveyor stops, the contacts 99 reclose to complete the circuit of the up direction relay through the closed selector contacts 97b, so that the lift arms are raised until the upper limit switch 64 is opened to break the relay circuit, at which time the lid is fully raised.

When the conveyor re-starts, the down direction relay is immediately energized through the contacts 94, which close when the conveyor relay is energized, closed selector contacts 93d, lower limit switch 65 and the winding 92.

Finally, in order to change over from condensed bread to open bread, it is necessary for the tray lid to be lifted before the trays are tilted to discharge the baking tins and for the lid to be lowered onto the tray base before the tray is reloaded at the loading station.

This is accomplished by closing selector contacts 93b and 98, the latter being in circuit with the up direction relay 91 through the intermediate limit switch 68.

Thus when the auxiliary relay C drops out, due to the operation of the time delay switch 72 by the hexagonal cam 70, the contacts C3 close to complete the circuit of the up direction relay through closed contacts 98 and the closed contacts of the intermediate limit switch. The lift arms thus rise to lift the tray lid before the bread tins are discharged, but their upward movements are arrested when the intermediate limit switch is operated.

As the now empty tray continues to move upwardly to the loading position, the lid remains supported on the stationary lifting arms and so is deposited on the tray base at or about the time that the tray reaches the loading station. As the conveyor stops, the contacts 99 close to complete the circuit of the down direction relay through the closed selector contacts 93b. The lifting arms thus return to and stop at their fully retracted positions.

Thus the lid actuating mechanism is automatically controlled for the baking of open or condensed bread and so as to change over from either one to the other. It will be apparent that various other circuit arrangements and actuating devices may be employed to produce the same results and it is therefore to be understood that the invention comprehends such alternatives. For example, a hydraulic cylinder may be used to raise and lower the lifting arms 44, in which case, the up and down direction coils 91 and 92 respectively may constitute the windings of solenoid operated control valves.

I claim:

1. A continuous baking oven comprising a plurality of swing trays, each tray having a base on which baking tins or the like may be removably supported and which normally is disposed substantially horizontally, the said tray base being arranged at such a distance below the pivotal axis of the tray that baking tins supported on the base are disposed wholly therebelow, a lid individual to each tray and disposed substantially parallel to and above the base thereof, the said lid being substantially equal in length to the tray base and being adapted to rest on and cover baking tins supported on the base, the said lid being also adapted to support material to be baked, coacting guide means on the tray and lid to permit the latter to be raised and lowered in a path substantially at right angles to the plane of the base while maintaining it substantially parallel thereto at all times, means operable to raise and lower the lids, and means arranged to tilt the successive trays at a predetermined position in the path of movement thereof, thereby to discharge the loads carried thereby, each lid, when in its lowermost position, being disposed close to the base of the respective tray and, when in its uppermost position, being disposed close to the said pivotal axis of the tray so as to be above and spaced from the baking tins when the latter are supported on the base.

2. A continuous bread baking oven comprising a structure forming an oven chamber, spaced endless conveyor members arranged therein, a plurality of regularly spaced swing trays arranged transversely between and supported by the conveyor members, means operable to actuate the conveyor members intermittently, whereby each swing tray stops in turn at a plurality of stations arranged in an endless path, including a station disposed opposite to a loading opening in the oven structure, each swing tray comprising a base which normally is disposed substantially horizontally and is adapted to support a load, e.g. a row of bread baking tins or the like, and suspension means secured to and extending upwardly from each end of the base and having their upper ends pivotally connected to the respective conveyor members, the base of the tray being disposed at such a distance below the pivotal axis that baking tins supported on the base are disposed wholly therebelow, and including a lid associated with each swing tray, the said lid being arranged above and substantially parallel to the base of the tray and between the said suspension means at the ends thereof, the said lid being adapted to rest directly on and cover baking tins supported on the base and being also adapted to support material to be baked, coacting guide means on the tray and lid to permit the latter to be raised and lowered relatively to the base and to maintain it substantially parallel thereto at all times, a plurality of angularly movable lifting arms operable in timed relation with the conveyor members to raise and lower the successive lids relatively to the associated trays at predetermined positions in the path of movement thereof, and projections on the opposite ends of each lid to coact with the said lifting arms, each lid, when in its lowermost position, being disposed close to the tray base whereby it may be used to support the material to be baked, the material when thus supported, being disposed wholly below the pivotal axis of the respective tray, and the said lid, when in its uppermost position, being disposed close to the said pivotal axis so as to be above and spaced from baking tins supported on the base.

3. A continuous bread baking oven comprising a structure forming an oven chamber, spaced endless conveyor members arranged therein, a plurality of regularly spaced swing trays arranged transversely between and supported by the conveyor members, means operable to actuate the conveyor members thereby to move the swing trays in succession through an endless path and past a loading opening in the oven structure, each swing tray comprising a base which normally is disposed substantially horizontally and is adapted to support a load, e.g. a row of bread baking tins or the like, a wall member secured to and extending upwardly from each end of the base and having its upper end pivotally connected to the respective conveyor member, the base of the tray being disposed at such a distance below the pivotal axis that baking tins supported on the base are disposed wholly therebelow, and including a lid associated with each swing tray, the said lid being arranged above and substantially parallel to the base of the tray and between the said end walls thereof, the said lid being adapted to rest directly on and cover baking tins supported on the base and being also adapted to support material to be baked, each of the said end walls of the tray being formed with a substantially vertical guide slot, a projection on each end of the lid extending through the respective guide slot, whereby the lid may be raised and lowered relatively to the base while remaining substantially parallel to the latter at all times, a spaced pair of coaxial pivoted arms operable and in timed relation with the conveyor members to engage the said end projections on the successive lids, thereby to raise and lower the latter relatively to the associated trays at predetermined positions in the path of movement thereof, and wherein each lid, when in its lowermost position, is disposed close to the tray base whereby it may be used to support the material to be baked, the material when thus supported, being disposed wholly below the pivotal axis of the respective tray, and the said lid, when in its uppermost position, being disposed close to the said pivotal axis so as to be above and spaced from baking tins supported on the base.

4. A continuous bread baking oven comprising a structure forming an oven chamber, spaced endless conveyor members arranged therein, a plurality of regularly spaced swing trays arranged transversely between and supported by the conveyor members, means operable to actuate the conveyor members thereby to move the swing trays in succession through an endless path and past a loading opening in the oven structure, each swing tray comprising a base which normally is disposed substantially horizontally and is adapted to support a load, e.g. a row of bread baking tins or the like, a wall member secured to and extending upwardly from each end of the base and having their upper ends pivotally connected to the respective conveyor members, the base of the tray being disposed at such a distance below the pivotal axis that baking tins supported on the base are disposed wholly therebelow, and including a lid associated with each swing tray, the said lid being arranged above and substantially parallel to the base of the tray and between the said end walls thereof, the said lid being adapted to rest directly on and cover baking tins supported on the base and being also adapted to support material to be baked, coacting guide means on the tray and lid to permit the latter to be raised and lowered relatively to the base and to maintain it substantially parallel thereto at all times, a spaced pair of coaxial pivoted lifting arms operable to raise and lower the successive lids relatively to the associated trays at predetermined positions in the path of movement thereof, means operable to raise and lower the said arms in timed relation with the conveyor, each lifting arm comprising inner and outer portions and a knuckle joint connecting the said inner and outer portions of each lifting arm to permit the said outer portions thereof to pass an obstruction while moving downwardly, and wherein each lid, when in its lowermost position, is disposed close to the tray base whereby it may be used to support the material to be baked, the material when thus supported, being disposed wholly below the pivotal axis, and the said lid, when in its uppermost position, being disposed close to the pivotal axis of the respective swing tray so as to be above and spaced from baking tins supported on the base.

5. A continuous bread baking oven comprising a structure forming an oven chamber, spaced endless conveyor members arranged therein, a plurality of regularly spaced swing trays arranged transversely between and supported by the conveyor members, means operable to actuate the conveyor members intermittently whereby swing trays stop in succession at a plurality of stations along an endless path which extends upwardly adjacent to an opening in one end of the oven structure, fixed members arranged for engagement by the successive trays adjacent to the said opening thereby to tilt the trays to cause the baked products to be discharged therefrom, each swing tray comprising a base which normally is disposed substantially horizontally and is adapted to support a load, e.g. a row of bread baking tins or the like, suspension means secured to and extending upwardly from each end of the base and having their upper ends pivotally connected to the respective conveyor members, the base of the tray being disposed at such a distance below the pivotal axis thereof that baking tins supported on the base are disposed wholly therebelow, and including a lid associated with each swing tray, the said lid being arranged above and substantially parallel to the base of the tray and between the said suspension means at the ends thereof, the said lid being adapted to rest directly on and cover baking tins supported on the base and being also adapted to support material to be baked, coacting guide means on the tray and lid to permit the latter to be raised and lowered relatively to the base and to maintain it substantially parallel thereto at all times, spaced lifting arms pivotally supported about a transverse axis located inwardly of the trays as they move upwardly past the said oven opening, the said arms being normally disposed in a retracted position in which they project downwardly and means operable in timed relation with the conveyor members, firstly to move the said lifting arms forwardly and upwardly below the lids of the successive trays thereby to lift the said lids and secondly, to move the said arms downwardly to their normal retracted positions, thereby to lower the said lids and wherein each lid, when in its lowermost position, is disposed close to the tray base whereby it may be used to support the material to be baked, the material when thus supported, being disposed wholly below the pivotal axis of the respective tray, and the said lid, when in its uppermost position, being disposed close to the said pivotal axis so as to be above and spaced from baking tins supported on the base.

6. A continuous bread baking oven according to claim 5, including selector means operable to control said means for moving the lifting arms, whereby the successive lids may be raised either before or after the successive trays are tilted to discharge the baked products and whereby the said lids may be lowered either before or after the respective trays stop at the loading station.

7. A continuous bread baking oven comprising an endless conveyor, a plurality of swing trays pivotally mounted on the conveyor and arranged at uniform spacings thereon, means operable to actuate the conveyor intermittently, whereby the swing trays are caused to stop in turn at a plurality of stations, including a loading station, each swing tray having a base on which baking tins or the like may be removably supported and which normally is disposed substantially horizontally, each tray also including an upstanding member at each end of the base thereof, a lid individual to each tray and arranged above and substantially parallel to the base and between the end members thereof, the said lid being adapted to rest on and serve as a cover for baking tins or the like on the base and being also adapted to support material to be baked, coacting guide means on the lid and the said end members to permit the former to be bodily raised and lowered relatively to the base and to maintain it substantially parallel thereto at all times, the said lid, when in its lowermost position, being disposed close to the base and when in its uppermost position, being disposed close to the upper ends of the said end members so as to be above and spaced from baking tins supported on the base, and including means operable to discharge baked products from the successive trays before they arrive at the said loading station, means operable to raise each lid either before or after the baked products have been discharged from the respective tray, said last-mentioned means being also operable to cause each lid to be lowered either before or after the respective tray stops at the loading station.

8. A swing tray for a continuous baking oven comprising a base adapted to support baking tins or the like, an upstanding wall member secured to each end of the base, the said wall members being adapted near their upper ends to be pivotally connected to a movable support, the said base being arranged at such a distance below the pivotal axis that baking tins supported on the base are disposed wholly therebelow, a lid arranged above and substantially parallel to the base, the said lid being adapted to rest on and cover bread tins supported on the base and being also adapted to support material to be baked, each end wall member being formed centrally with a vertical guide slot, and coacting guide means on each end of the lid and projecting into the respective guide slots, whereby the lid may be raised and lowered relatively to the base while being maintained substantially parallel thereto at all times, the said lid, when disposed in its lowermost position, being disposed close to the base, whereby it may be used to support the material to be baked and when disposed in its uppermost position, being disposed close to the said pivotal axis so as to be above and spaced from baking tins supported on the base.

9. A swing tray for a continuous baking oven comprising a base adapted to support baking tins or the like, an upstanding suspension member secured to each end of the base, the said suspension members being adapted near their upper ends to be pivotally connected to a movable support, the said base being arranged at such a distance below the pivotal axis that baking tins supported on the base are disposed wholly therebelow, a lid arranged above and substantially parallel to the base, the said lid being adapted to rest on and cover bread tins supported on the base and being also adapted to support material to be baked, and coacting guide means on said end suspension members and on the ends of the lid to permit the latter to be raised and lowered relatively to the base and to maintain it substantially parallel thereto at all times, the said lid, when disposed in its lowermost position, being disposed close to the base, whereby it may be used to support the material to be baked and, when disposed in its uppermost position, being disposed close to the said pivotal axis so as to be above and spaced from baking tins supported on the base.

10. A continuous bread baking oven comprising a structure forming an oven chamber, spaced endless conveyor members arranged therein, a plurality of regularly spaced swing trays arranged transversely between and supported by the conveyor members, means operable to actuate the conveyor members thereby to move the swing trays in succession through an endless path and past a loading opening in the oven structure, each swing tray comprising a base which normally is disposed substantially horizontally and is adapted to support a load, e.g. a row of bread baking tins or the like, and suspension means secured to and extending upwardly from each end of the base and having their upper ends pivotally connected to the respective conveyor members, the base of the tray being disposed at such a distance below the pivotal axis that baking tins supported on the base are disposed wholly therebelow, and a lid associated with each swing tray, the said lid being substantially equal in length to the base and being arranged above and substantially parallel thereto and between the said suspension means at the ends thereof, the said lid being adapted to rest directly on and cover baking tins supported on the base and being also adapted to support material to be baked, guide means projecting from each end of the tray and into corresponding guide slots defined by the respective end suspension means of the tray, the said guide slots being substantially rectilinear and disposed substantially at right angles to the plane of the tray base thereby to permit the lid to be raised and lowered relatively thereto, the said guide means being adapted to maintain the lid substantially parallel to the tray base at all times while permitting of limited angular movements thereof, and means operable in timed relation with the conveyor members to raise and lower the successive lids relatively to the associated trays at predetermined positions in the path of movement thereof, and wherein each lid, when in its lowermost position, is disposed close to the tray base whereby it may be used to support the material to be baked, the material when thus supported, being disposed wholly below the pivotal axis of the respective tray, and the said lid, when in its uppermost position, being disposed close to the said pivotal axis so as to be above and spaced from baking tins supported on the base.

11. A continuous baking oven comprising a plurality of pivoted trays, each tray having a base on which baking tins may be removably supported and which normally is disposed substantially horizontally, a shallow flat lid individual to each tray, each lid being disposed above and substantially parallel to the respective tray base and being substantially equal in length thereto, said lid being adapted to rest directly on top of the baking tins without substantially enclosing the latter, said lid being also adapted to support baking material on the upper surface thereof, and means operable to raise and lower each lid relatively and substantially between lowermost and uppermost positions and at right angles to the respective tray base, each lid when in its lowermost position being directly supported on the tray and disposed close to the base thereof so as to be substantially below the position which it occupies when supported on the baking tins, and each lid when in its uppermost position being spaced at such a distance above the base that the baking tins may be freely placed thereon or removed therefrom.

12. A continuous baking oven comprising a plurality of swing trays, each tray having a base on which baking tins or the like may be removably supported and which normally is disposed substantially horizontally, the said tray base being arranged at such a distance below the pivotal axis of the tray that baking tins supported on the base are disposed wholly therebelow, a shallow flat lid individual to each tray and disposed substantially parallel to and above the base thereof, the said lid being substantially equal in length to the tray base and being adapted to rest directly on and cover the upper portions only of baking tins supported on said base, the said lid being also adapted to support baking material on the upper surface thereof, limited lost motion guide means connecting the lid to the tray so as to permit said lid to be raised and lowered between lowermost and uppermost positions and relatively and substantially at right angles to the tray base while maintaining said lid substantially parallel thereto at all times, and means operable to raise and lower the lids, and wherein each lid when in its lowermost position is supported directly on the respective tray and close to the base thereof so as to be substantially below the position which it occupies when supported on the baking tins, and wherein said lid, when in its uppermost position, is disposed close to the said pivotal axis of the tray so as to be above and spaced from baking tins supported on the base thereof.

References Cited in the file of this patent

UNITED STATES PATENTS

| 740,395 | Carroll | Oct. 6, 1903 |
| 2,539,423 | Howard | Jan. 30, 1951 |
| 2,804,027 | Hecht | Aug. 27, 1957 |
| 2,809,598 | Rayner | Oct. 15, 1957 |

FOREIGN PATENTS

| 7,173 | Great Britain | Nov. 12, 1915 |
| 207,463 | Australia | Apr. 5, 1957 |